United States Patent
Nowoczynski et al.

(10) Patent No.: US 9,141,480 B2
(45) Date of Patent: Sep. 22, 2015

(54) HANDLING FAILED TRANSACTION PEERS IN A DISTRIBUTED HASH TABLE

(71) Applicant: DataDirect Networks, Inc., Chatsworth, CA (US)

(72) Inventors: Paul Nowoczynski, Brooklyn, NY (US); Jason Micah Cope, Columbia, MD (US); Pavan Uppu, Laurel, MD (US); Don Molaro, Cupertino, CA (US); Michael Piszczek, Laurel, MD (US); Gordon Manning, Ellicott City, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 166 days.

(21) Appl. No.: 14/035,913

(22) Filed: Sep. 24, 2013

(65) Prior Publication Data

US 2014/0108863 A1 Apr. 17, 2014

Related U.S. Application Data (60) Provisional application No. 61/715,242, filed on Oct. 17, 2012.

(51) Int. Cl.
| | |
|---|---|
| *G06F 11/00* | (2006.01) |
| *G06F 11/14* | (2006.01) |
| *G06F 11/07* | (2006.01) |
| *G06F 11/30* | (2006.01) |
| *G06F 17/30* | (2006.01) |

(52) U.S. Cl.
CPC ........ *G06F 11/1412* (2013.01); *G06F 11/0709* (2013.01); *G06F 11/3006* (2013.01); *G06F 17/30097* (2013.01)

(58) Field of Classification Search
CPC ............ G06F 11/0709; G06F 11/0727; G06F 11/3006; G06F 11/1412; G06F 17/30097; G06F 17/30094; G06F 11/1474; H04L 29/0854; H04L 29/08549
See application file for complete search history.

(56) References Cited

U.S. PATENT DOCUMENTS

2013/0031414 A1* 1/2013 Dhuse et al. .................... 714/37
2013/0325820 A1* 12/2013 Grube et al. .................. 707/691

OTHER PUBLICATIONS

Stoica et al., Chord: A Scalable Peer-to-peer Lookup Service for Internet Applications, Journal, http://pdos.csail.mit.edu/papers/chord:sigcomm01/chord_sigcomm.pdf, accessed Sep. 24, 2013, pp. 1-12.
Muthitacharoen et al., Etna: a Fault-tolerant Algorithm for Atomic Mutable DHT Data, Journal, MIT Computer Science and ArtiPcial Intelligence Laboratory, Issued Jun. 15, 2005. http://hdl.handle.net/1721.1/30555, pp. 1-10.

\* cited by examiner

*Primary Examiner* — Jason Bryan
(74) *Attorney, Agent, or Firm* — SoCal IP Law Group LLP; Mark A. Goldstein (57) ABSTRACT

Data storage systems and methods for storing data are described herein. The storage system includes at least two data storage nodes for storing portions of a distributed hash table and related data. After a first node attempts to complete a write request at a second node and is unable to complete the request, the first node ceases responses to interactions from other nodes. Once the first node's failure to respond has caused a sufficient number of nodes to cease responding, the nodes enter a service mode to resolve the live lock. While in live lock, the nodes determine the oldest, unfulfilled request using a system-wide logical timestamp associated with write requests. Once the oldest request is determined, a removal vote to remove the non-responsive node from the group is initiated and, if other nodes agree, the non-responsive node is removed from the group of nodes.

18 Claims, 5 Drawing Sheets

FIG. 1

| | Peer 0 202 | Peer 1 | Peer 2 | Peer 3 204 | Peer 4 | ... | Peer n |
|---|---|---|---|---|---|---|---|
| Filled | ○ | ○ | ○ | ○ | ○ | ○ | ○ |
| Delivered | ● | ● | ● | ● | ● | ● | ● |
| Delivery Acknowledge | ● | ● | ● | ● | ● | ● | ● |
| Commit | ● | ● | ● | ● | ● | ● | ● |
| Commit Acknowledge | ● | ● | ● | | ● | ● | ● |

Jumbo Transaction Group S 200

206

© 2013 DataDirect Networks

HANDLING FAILED TRANSACTION PEERS IN A DISTRIBUTED HASH TABLE

RELATED APPLICATION INFORMATION

This patent claims priority from provisional patent application No. 61/715,242 filed Oct. 17, 2012 which is incorporated by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to data stored in a data storage system and an improved architecture and method for storing data to and retrieving data from a data storage system made up of a large number of nodes and reliant upon a distributed hash table.

2. Description of the Related Art

A file system is used to store and organize computer data stored as electronic files. File systems allow files to be found, read, deleted, and otherwise accessed. File systems store files on one or more storage devices. File systems store files on storage media such as hard disk drives and solid-state storage devices.

Various applications may store large numbers of documents, images, audio, videos and other data as objects using a distributed data storage system in which data is stored in multiple locations.

Distributed hash tables (DHT or, plural, DHTs) are decentralized systems that enable information, such as computer data, to be stored within a group of servers. When file access is requested, a hashing function is used to point the request to a particular location (or locations) within the group of servers. In order to ensure that individual data sets remain available within the group of servers, prior art systems have enforced a blocking system in which data elements may not be written to when others are in the process of accessing those data elements.

When one of the servers fails, the DHT may point a request to a non-existent server within the group of servers. The pointers or other references must be updated once a determination is made that a server has failed.

For example, CHORD and ETNA DHT systems maintain a so-called key successor relationship with one other server local to that server. When the primary server fails, the key successor server, typically within one Internet "hop" away, fills the gap and is the next server looked-to by the system when using the CHORD or ETNA DHT. This approach has the unfortunate result of failing when a portion of the network serving the server and its key successor server goes down. While the servers may both have the appropriate data sets, they are inaccessible. Other portions of the network of the group of servers, if available, must be accessed in order to find the data sets. In addition, utilizing a key successor relationship results in placing the rectification load on the single key successor rather than distributing the load associated with rectification throughout the system.

Spreading the data around throughout the group of servers ensures that a single failure or localized failure is much less likely to result in a situation in which the system must stop access and/or writes to the data sets in order to recover. However, the distributed nature of the data in these systems introduce other problems, such as determining when one or more of a plurality of the servers is unavailable.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

One elegant solution for maintaining a large data set in a distributed way is to distribute the data according to a distributed hash table. Under such a scheme, a hashing algorithm or similar "hash" is applied to any read, write, or other access request for data stored in the DHT system. This hash will point the request to the right portion of the distributed data and enable read, write and other requests to take place in an orderly fashion. Such a distributed hash table system is described in earlier filed co-pending patent application Ser. No. 14/028,292.

When data sets are distributed around the group of servers, determining when to remove a server from a group of servers becomes quite important. If a server is unavailable, the data stored on that server must be reallocated among the remaining servers. Failure to recognize server failure may result in processing throughput degradation, lost data or longer-term inaccessibility.

The system described herein requires that writes be completed in the order they were requested and requires that each write request of the same data set occur at substantially the same time for a group of nodes. This has numerous benefits, including ensuring data integrity and ensuring that subsequent write requests for a data item only overwrite older data. Ensuring that write requests only proceed in order also enables the servers to collectively and quickly determine when one or more servers are non-responsive, to quickly remove non-responsive servers, to determine the location of additional copies of the data stored on non-responsive servers, to perform data rectification, and to perform the hashing necessary to identify the new location of data previously on the now-removed server.

Environment

Figure 1:
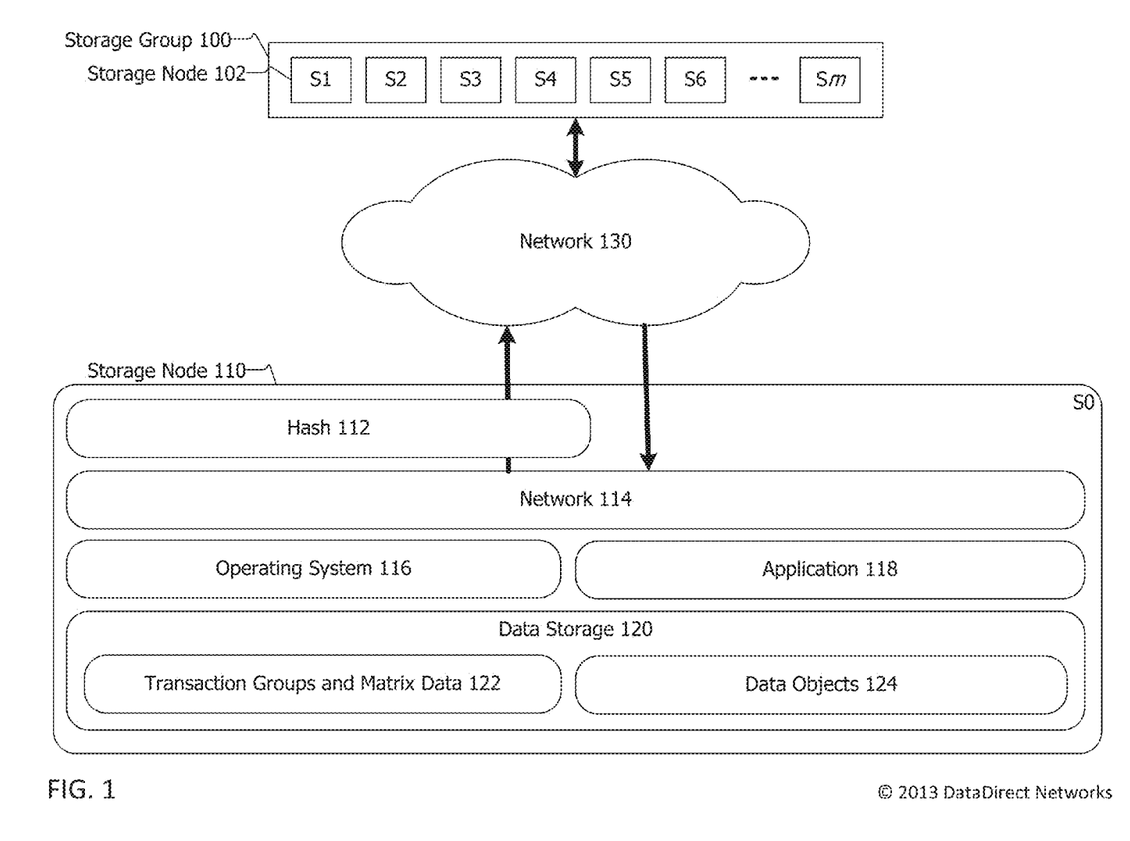
FIG. 1 is a block diagram of a series of storage nodes in a network.

FIG. 1 is a block diagram of a series of storage nodes in a network. The nodes S0 110, S1 102 through Sm, of which only S0 110 and S1 102 are labeled, may make up a storage group 100. These storage nodes S0 110, S1 102 and all those making up storage group 100 may be server computers with central processing units, memory, non-volatile storage, network connectivity and various input and output systems.

The storage group 100 may be interconnected by a network, such as network 130. Data is written to the network from other nodes, such as storage node S0 110 through a hash 112. This hash 112 may be or include an algorithm, a seed, or any other form of data that may be used to derive the location of a particular data object within the DHT system. All or a portion of the "hash" may be stored on each storage node, as necessary. A "data object," as used herein means data stored within the DHT system in the form of files, file fragments, raw binary data and data in various other forms. A "request" as used herein means an attempted access of a data object. A request may be, for example, an attempt to write or an attempt to read a data object.

Other nodes may interact with storage node 110 through a network adaptor 114. An operating system 116 and application layer 118 (including applications embodying the systems described herein) may also be present on each node. Data storage 120 may store transaction groups and matrix data 112 (discussed below) along with data objects 124.

Figure 2:
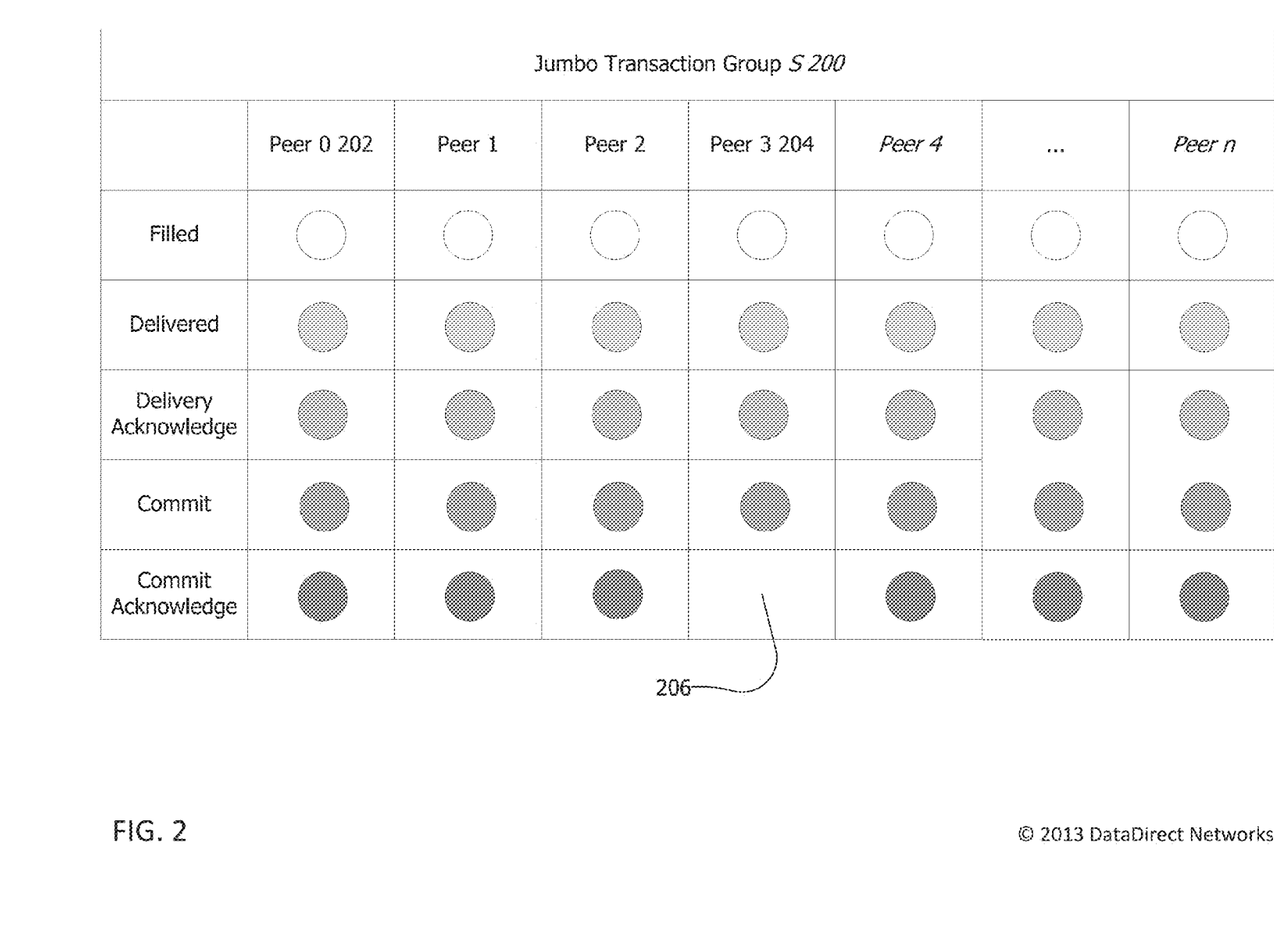
FIG. 2 is an abstraction of a jumbo transaction group S.

FIG. 2 is an abstraction of a jumbo transaction group (JTG) S 200. A jumbo transaction group, such as jumbo transaction group S 200, is a plurality of batched operations designated for a plurality of storage node peers—for example, other storage nodes within a storage group 100. The word "peer" within this patent refers to storage nodes within a particular storage node's storage group or jumbo transaction group. FIG. 2 is an abstraction of the jumbo transaction group batching process in table form for illustrative purposes.

Jumbo transaction groups may be used, for example, to batch a series of data object requests together so that a given storage node may make requests of its peer storage nodes in groups, rather than as each request comes into the storage node. In this way, the volume of data traffic across all of the storage nodes can be minimized, while ensuring that the traffic that does occur is substantive. This helps to avoid situations in which the network is flooded with millions of requests to access, read or write tiny amounts of data (bytes or kilobytes).

The JTG group S 200 includes columns dedicated to each of a plurality of storage nodes involved n the JTG. The total number of storage nodes involved in a given JTG may vary from one to many. A typical scenario involves more than five. The rows of the JTG group S 200 are demonstrative of a two-stage commit protocol for transactions amongst the storage nodes. The first stage is made up of a "filled" request, a "delivered" request, and a "delivery acknowledgement" "Filled" means that the group of requests has been filled to capacity and is ready for the JTG to begin the delivery process. "Delivered" means that the request has been sent to the appropriate storage node. "Delivery acknowledgement" means that the request has been acknowledged, in a manner similar to a TCP/IP "ACK", by the intended recipient storage node.

The final stage is made up of a "commit" and a "commit acknowledge." The "commit" is a command to fulfill the request, for example to write it to the storage node(s). The "commit acknowledge" is a response that the request has been completed.

This process ensures that these batched transactions are completed by each storage node that is relevant to the request. By requiring commits and commit acknowledgements during the stages, any failures of storage nodes mid-process can be quickly alleviated. In addition, requiring commits and commit acknowledgements serve the function of quickly identifying any non-responsive storage nodes.

In FIG. 2, peer 0 202 appears to have completed all processes up to the "commit acknowledge" stage. All other peers, except for peer 3 204, have completed the process up to this stage. Because peer 3 204 has not yet responded, this may be indicative that peer 3 204 is non-responsive. This may be seen in block 206 which, for purposes of illustration, is unfilled. Situations where a storage node is non-responsive must be dealt with quickly in order to ensure that other JTG processes can continue. Until peer 3 204 responds, this JTG will not be able to complete, leaving the "commit acknowledge" phases to be completed.

Figure 3:
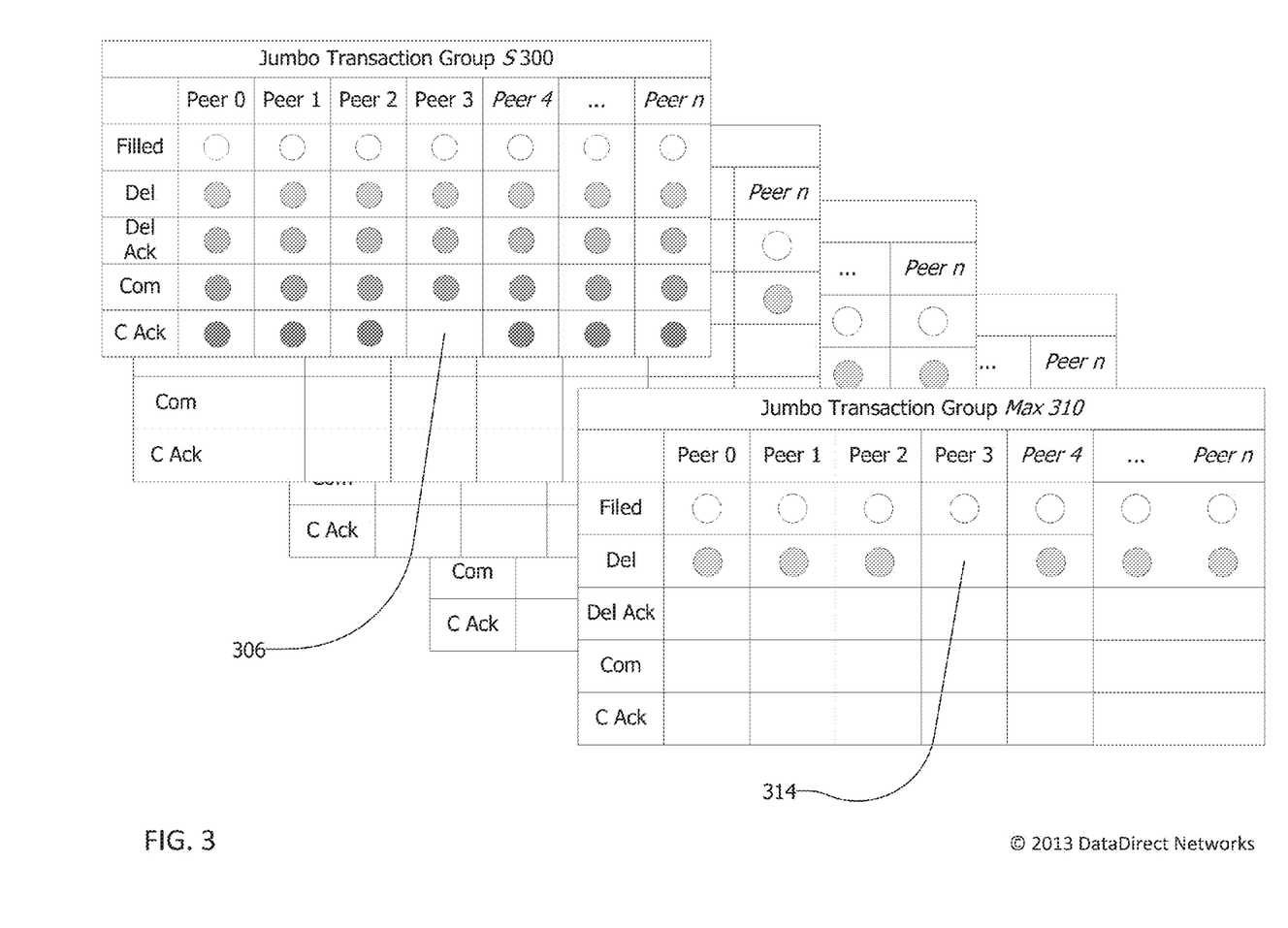
FIG. 3 is an abstraction of a plurality of jumbo transaction group tables S through S Max.

Turning now to FIG. 3, an abstraction of a plurality of jumbo transaction groups S through S Max is shown. In the system described herein, a given storage node is only allotted a pre-determined number of open JTGs. Furthermore, JTGs must be completed in the order in which they were requested. This, among other things, ensures that older data is written before newer data and that newer data always overwrites older data. It also enables discovery of non-responsive storage nodes. FIG. 3, shows the JTGs subsequent to the one shown in FIG. 2.

Jumbo transaction group S 300 may be the same as JTG S 204 shown in FIG. 2. As can be seen, block 306 is not filled in, indicating that peer 3 has not yet responded with a "commit acknowledge." Similarly, subsequent JTGs, such as JTG Max 310 have not proceeded beyond a "filed" status with regard to peer 3. This may be seen by an unfilled portion of the JTG Max 310 in block 314.

Because peer 3 has not responded in JTG S 300 with a "commit acknowledge," no other responses are being sent by or received from peer 3. In order to operate efficiently, responses to portions of JTGs received by a storage node will be added to outgoing JTGs. So, for example, the initiation of, for example in JTG Max 310, the delivery process cannot proceed because no responses have been returned from peer 3 since the "commit" request was sent in JTG S 300. Eventually, a predetermined, maximum number of uncompleted JTGs is reached and the associated storage node is incapable of moving forward with any subsequent data processing. This predetermined maximum number of uncompleted JTGs may be called a "pool" or "JTG pool." A storage node's exhaustion of the JTG pool may be referred to as a "live lock" scenario. In a "live lock" scenario he storage node is still functioning, but cannot proceed because at least one other storage node has stopped responding to its requests.

Figure 4:
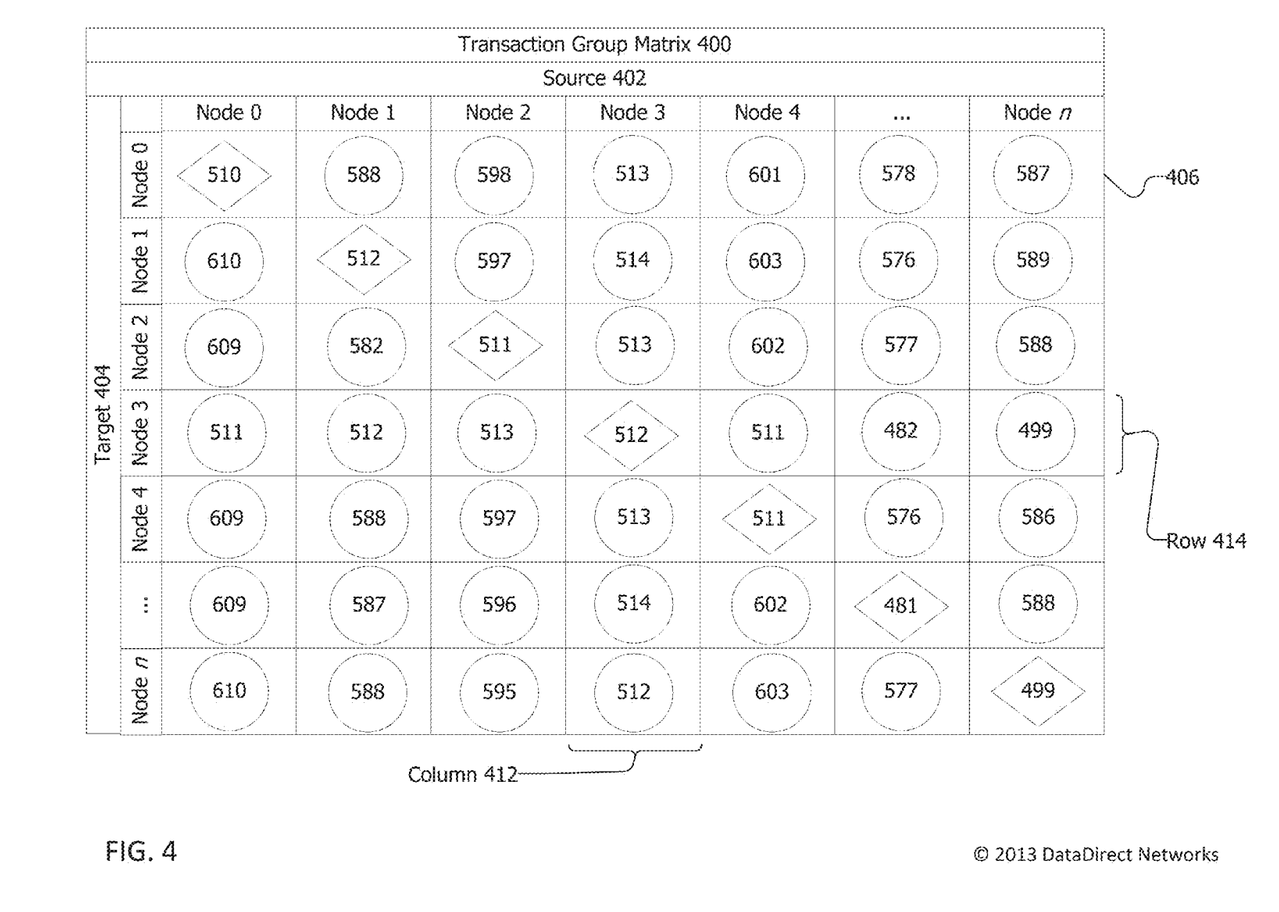
FIG. 4 is an abstraction of a transaction group matrix gathered by a single node.

Turning now to FIG. 4, an abstraction of a transaction group matrix 400 gathered by a single storage node is shown. The matrix includes source 402 nodes and target 404 nodes. Each JTG includes a transaction identification number that is generated by a monotonic logical clock, relative to every earlier transaction by a given storage node. Because of the interdependence of the storage nodes, the logical clocks for each of the storage nodes are typically in close numerical proximity to one another.

The transaction group matrix 400 is a table generated through interactions with and, in some cases, a request to obtain, the logical clock data associated with each of the peer storage nodes with which the storage node that generated the matrix 400 is in communication. Whatever the source of the logical clock data, it is represented with respect to each node and that node's communication with other nodes. For example, node n's last communication (at 406 in FIG. 4) to node 0 bore a logical timestamp of 587 indicating, in this example, that the communication was the 587$^{th}$ communication originating from node n. The diamonds in FIG. 4 represent committed transactions, while the circles represent acknowledged transactions. Communications shown as from node 0 to node 0, for example, are the last transaction identification associated with a commit operation on node 0.

Transaction group matrix 400 may be generated by a storage node, for example, when the storage node is presented with a "live lock" scenario in which it has exhausted all available outstanding JTGs and is unable to continue processing requests. The matrix 400 shows that the last commit was up to 100 requested transactions ago, bearing a logical timestamp from 499 to 512, while the acknowledged transactions vary in timestamp from 482 to 610. Accordingly, it is likely that sometime around the 499 to 512 transaction identification, that the "live lock" scenario began.

Further review of the matrix 400 reveals that, for each storage node, the lowest logical clock designations are each in communications involving node 3. Column 412 includes transaction identification numbers very close to that 499 to 512. Row 414 includes similar transaction identification numbers. In addition, of the transaction identifications associated with, for example, node 1, the transactions involving node 3 as a target bears the lowest transaction identification of 512. The next-closest is 582 with node 2. Similarly, node 4's most recent transaction identification is 603, where its most recent transaction identification with node 3 is 511. Clearly, node 3 has ceased responding to the other storage nodes.

Processes

Figure 5:
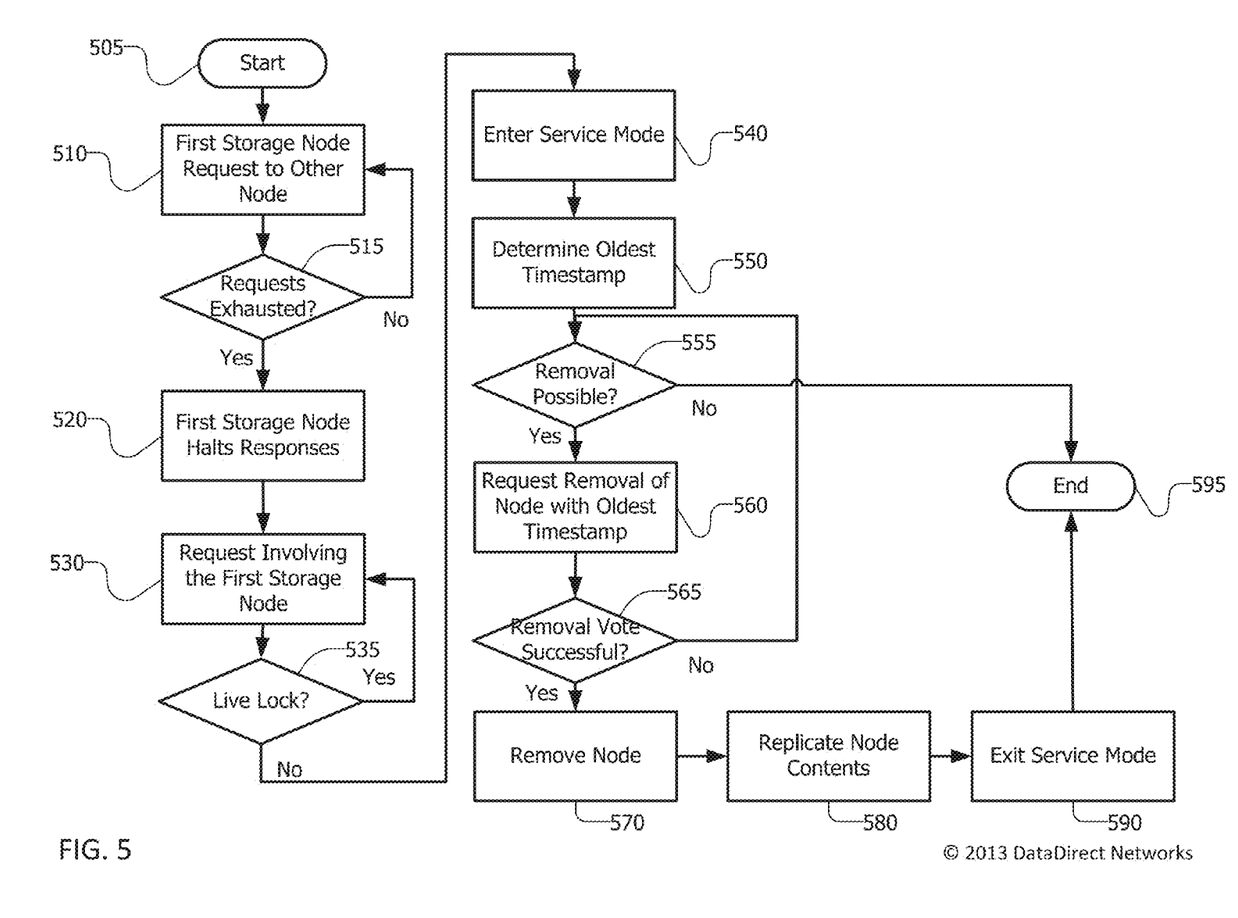
FIG. 5 is a flow chart of a method of storage node removal of non-responsive members of a group of servers.

Turning now to FIG. 5, a flow chart of a method of storage node removal of non-responsive members of a group of servers is shown. The process has a start 505 and an end 595 but may be cyclical. In addition, more than one instance of the process on one or more storage nodes may simultaneously be at various stages.

Once the process has started at 505, the first storage node makes a request to another storage node at 510. This request may be a part of a JTG, such as JTG S 200 of FIG. 2, in which a plurality of requests are being made to multiple storage nodes at once. Many requests may be made to any number of storage nodes from the first storage node. One of the requests made by the first storage node to another storage node at 510 may result in no response from the other storage node.

A check is made after a request is made to confirm that all available requests for a storage node have not been exhausted at 515. At that point, other requests can go forward until a predetermined number of JTGs have been exhausted. As discussed above, each storage node is allocated a pool of JTGs before the storage node is unable to issue additional JTGs and, after which, the storage node effectively "live locks" as functional, but non-responsive. An outstanding JTG is one that has not completed the "commit acknowledge" phase discussed above with respect to FIG. 2.

Once all requests have been exhausted at 515, the first storage node halts responses 520. The time necessary to exhaust a pool of available JTGs is variable dependent upon the pool of JTGs available and the speed at which the overall storage system is making requests of one another. During that time, the first storage node continues to respond to later requests. Because the logical clock is monotonic, these later requests bear transaction identification numbers that are all later than that involving the node that has failed to respond.

Eventually, other storage nodes operating in the same fashion will make a request involving the first storage node at 530. If the first storage node has exhausted all JTGs and is effectively in a "live lock" situation, it will not respond to any requests from the other storage nodes, thus eventually generating a "live lock" situation in those storage nodes as well.

Once any node determines that it is in a "live lock" situation at 535 in which all JTGs are exhausted and in which at least one storage node has failed to respond to an outstanding request, it will enter a service mode at 540 in order to resolve the situation. When a storage node determines that it is not in "live lock" it will continue to make requests, including requests involving the first storage node 530 until it does reach a "live lock" situation.

Once in service mode at 540, the nodes operate together to determine the source of the "live lock." As a preliminary step, while in service mode, a storage node may request data sufficient to fill a transaction group matrix, such as the transaction group matrix 400 of FIG. 4. Because the requests (such as the JTGs in this case) are each labeled with a logical clock timestamp, the oldest, pending request may be ascertained. For example, in FIG. 4, the oldest request associated with node 1 involves node 3 because it has a logical timestamp of 512. Similarly, the oldest request associated with node 4 also involves node 3 because it bears a logical timestamp of 511.

The storage nodes may, then, begin the process of removal of the non-responsive storage node. Before a removal vote can occur, the storage nodes determine collectively that removal is possible at 555. If removal is not possible, the process ends without removal of the non-responsive node. For example, rules regarding the status of other servers may require that there be adequate replication available in the storage group to compensate for the loss of a particular storage node. One example of such a rule is a requirement that the vote to remove must exceed the total number of available storage nodes minus the number of failed storage nodes from which recovery of the storage group is possible. For example, if there were a total of 1000 storage nodes currently available, one has failed, and recovery is possible if 500 nodes are still functioning, removal is possible. Similarly, the vote necessary to remove must exceed the total number of nodes necessary to effect a recover or, in this example, 500 nodes. If there are currently only 400 functioning nodes under the same scenario, removal is not possible.

If removal is possible at 555, then one of the nodes requests a removal vote to request removal of the node with the oldest timestamp from the storage group at 560. The requesting storage node is most likely the first storage node that experienced the "live lock" situation, but may be any of the nodes. This request, utilizing communication protocols outside of the JTG process will take place across all nodes.

Those nodes that are also experiencing a "live lock" situation gather the same transaction group matrix 400 and vote accordingly. If the storage node that is the subject of the vote appears to be the source of the "live lock" for those nodes, the nodes will vote to approve the removal of the target storage node from the storage group. When the nodes are unable to determine the source of the "live lock" or when they are not yet in a "live lock" situation; they may vote not to remove the target storage node. If the vote is unsuccessful at 565, the process returns to an evaluation of whether the removal is possible at 555, and the process will continue with subsequent removal votes likely once other storage nodes have been effected.

If the vote is successful at 656, meaning that the vote has succeeded and met a threshold such as a vote by a total exceeding the total number of nodes necessary to recover from the removal of a storage node, the target node will be removed from the storage group at 570.

Once the node is removed, the storage group replicates the data that was stored on that storage node within the remainder of the storage group at 580. This process requires the next highest ranked storage node to oversee the replication of each data portion to a still higher ranked server. In the present system, storage nodes are ranked through the use of the hash key for priority for each data object. So, for each data object, a successor list is automatically generated. When one of the storage nodes is removed from the storage group, the storage nodes ranked either above or below that storage node for a given data object receive a copy of that data object to as to maintain a set level of redundancy. Requests for a data object are given, using the hash key, to the available storage node with the highest priority. When that storage node is unavailable or when then that storage node has been removed, the next-highest priority node for that data object is identified automatically through the use of the hash key. This ranking for a given data object, though not maintained as an explicit table or listing, but reliant upon the operation of the hash key, may be called a successor list.

So, for example, a storage node with a ranking of priority −1 in the existing successor list relative to a data object in the now-removed node would bear responsibility to copy the data object to the priority +1 in the successor list. Subsequent requests made for the data object will be directed, by operation of the hash key, to other storage nodes in the successor list. So, when incoming requests determine that the now-removed node has been removed, the hash key will refer those requests to other storage nodes in the successor list priority +/−1 to obtain the data object. Earlier requests that refer to the now-removed storage node will timeout and be re-requested. The new requests will refer to one of the successor nodes. All requests made to the now-removed node are handled similarly.

Once the contents are properly replicated, the server exits service mode at 590. Any potential data object access conflicts may be resolved using the transaction identification numbers by relying on the higher numbers as relating to more-recent data. All outstanding requests that were pending before the beginning of service mode may be re-requested or the pending JTGs may be handled in the order they were previously entered with the successor storage node standing in for the now-removed storage node.

The process ends at 595.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A data storage method comprising:
   a first storage node issuing a first request to a second storage node, the first request including a logical timestamp indicating the time, relative to other requests, that the first request was issued;
   the first storage node exhausting a first pool of non-committed requests before the second storage node acknowledges the first request;
   the first storage node halting any responses to requests issued by other storage nodes until the second storage node acknowledges the first request;
   at least one other storage node issuing a second request to the first storage node and receiving no response;
   the at least one other storage node exhausting a second pool of non-committed requests before the first storage node acknowledges the second request;
   the at least one other storage node halting any responses to requests issued by other storage nodes until the first storage node acknowledges the second request;
   the first storage node and the at least one other storage node, together, using the logical timestamp to determine that the second storage node failure to acknowledge the first request is a basis for the first storage node and the at least one other storage node halting responses to requests; and
   the first storage node and the at least one other storage node entering a service mode to resolve the failure of the second storage node to acknowledge the first request.

2. The method of claim 1 wherein the service mode comprises:
   the at least one other storage node evaluating the second pool of non-committed requests to determine that a second logical timestamp associated with the second request is oldest;
   the first storage node evaluating the first pool of non-committed requests to determine that the logical timestamp associated with the first request is oldest; and
   the first storage node and the at least one other storage node together determining that the second storage node is not responding and removing the second storage node from a group of available storage nodes.

3. The method of claim 2 wherein the together determining further comprises:
   the first storage node requesting a removal vote from the at least one other storage node with regard to the second storage node, the removal vote being a vote to remove the second storage node from the group of available storage nodes;
   the at least one other storage node determining that the second logical timestamp associated with the second request is oldest; and
   the at least one other storage node agreeing with the first storage node to the removal vote.

4. The method of claim 3 wherein a total number of storage nodes casting the removal vote must be greater in number than a number of nodes necessary to continue operation of the group of available storage nodes.

5. The method of claim 1 further comprising:
the first storage node identifying a data object stored on the second storage node and identifying a third storage node, the third storage node ranked after the second storage node in a ranking associating the data object with at least the second storage node and the third storage node; and
the first storage node duplicating the data object to the third storage node.

6. The method of claim 5 wherein a ranking of the first storage node and a ranking of the at least one other storage node, along with the rankings of the second storage node and the third storage node do not change when the second storage node is removed from a group of available storage nodes.

7. The method of claim 1 wherein the logical timestamp uses a monotonic clock to stamp all requests across a group of available storage nodes.

8. The method of claim 1 wherein the logical timestamp may be used to resolve conflicts in which two or more of a group of available storage nodes attempt to access to a data object by relying upon a most recent logical timestamp to resolve any potential conflict.

9. The method of claim 1 wherein the first and second requests are re-requested to one of a group of available storage nodes after the first storage node and the at least one other storage node exit the service mode.

10. A distributed data storage system comprising:
a first storage node having a processor, a memory, and a non-volatile storage, the first storage node configured to perform actions including:
issuing a first request to a second storage node, the first request including a logical timestamp indicating the time, relative to other requests, that the first request was issued,
exhausting a first pool of non-committed requests before the second storage node acknowledges the first request, and
halting any responses to requests issued by other storage nodes until the second storage node acknowledges the first request;
at least one other storage node having a processor, a memory, and a non-volatile storage, the at least on other storage node configured to perform actions including:
issuing a second request to the first storage node and receiving no response,
exhausting a second pool of non-committed requests before the first storage node acknowledges the second request,
halting any responses to requests issued by other storage nodes until the first storage node acknowledges the second request; and
wherein the first storage node and the at least one other storage node, together
use the logical timestamp to determine that the second storage node failure to acknowledge the first request is the basis for the first storage node and the at least one other storage node halting responses to requests, and
enter a service mode to resolve the failure of the second storage node to acknowledge the request.

11. The distributed data storage system of claim 10 wherein:
the at least one other storage node evaluating the second pool of non-committed requests to determine that a second logical timestamp associated with the second request is oldest;
the first storage node evaluating the first pool of non-committed requests to determine that the logical timestamp associated with the first request is oldest; and
the first storage node and the at least one other storage node together determining that the second storage node is not responding and removing the second storage node from a group of available storage nodes.

12. The distributed data storage system of claim 11 wherein the first storage node and the at least one other storage node are further configured to perform actions including:
requesting a removal vote with regard to the second storage node, the removal vote being a vote to remove the second storage node from the group of available storage nodes;
determining that the second logical timestamp associated with the second request is oldest; and
agreeing to the removal vote.

13. The distributed data storage system of claim 12 wherein a total number of storage nodes casting the removal vote must be greater in number than a number of nodes necessary to continue operation of the group of available storage nodes.

14. The distributed data storage system of claim 10 wherein the first storage node is further configured to perform actions including:
identifying a data set stored on the second storage node and identifying a third storage node, the third storage node ranked after the second storage node in a ranking associating the data set with at least the second storage node and the third storage node; and
duplicating the data object to the third storage node.

15. The distributed data storage system of claim 14 wherein a ranking of the first storage node and a ranking of the at least one other storage node, along with the rankings of the second storage node and the third storage node do not change when the second storage node is removed from a group of available storage nodes.

16. The distributed data storage system of claim 10 wherein the logical timestamp uses a monotonic clock to stamp all requests across a group of available storage nodes.

17. The distributed data storage system of claim 10 wherein the logical timestamp may be used to resolve conflicts in which two or more of a group of available storage nodes attempt to access a data object by relying upon a most recent logical timestamp to resolve any potential conflict.

18. The distributed data storage system of claim 10 wherein the first and second requests are re-requested to one of a group of available storage nodes after the first storage node and the at least one other storage node exit the service mode.

* * * * *